(12) United States Patent
Lawrence et al.

(10) Patent No.: US 6,504,100 B2
(45) Date of Patent: Jan. 7, 2003

(54) FLEXIBLE INTRA-CABINET CABLE RING WIRE MANAGEMENT SYSTEM

(75) Inventors: James I. Lawrence, Georgetown, TX (US); Mark R. Benavides, Round Rock, TX (US); Daniel W. Walker, Leander, TX (US); William D. Krietzman, Elk, WA (US); D. Brian Donowho, Austin, TX (US); Bryan W. Hurley, Georgetown, TX (US); Gregory W. Keith, Georgetown, TX (US)

(73) Assignee: Chatsworth Products, Inc., Westlake Village, CA (US)

( * ) Notice: Subject to any disclaimer, the term of this patent is extended or adjusted under 35 U.S.C. 154(b) by 0 days.

(21) Appl. No.: 09/803,313

(22) Filed: Mar. 9, 2001

(65) Prior Publication Data

US 2002/0074149 A1 Jun. 20, 2002

Related U.S. Application Data

(60) Provisional application No. 60/257,035, filed on Dec. 20, 2000.

(51) Int. Cl.$^7$ ............................. H02G 3/00; H02B 1/01
(52) U.S. Cl. ......................... 174/100; 211/26; 248/65; 361/826
(58) Field of Search ....................... 174/68.3, 70 C, 174/72 A, 72 C, 72 R, 95, 100, 101; 211/26, 8, 41.1, 94.01; 248/65; 361/826

(56) References Cited

U.S. PATENT DOCUMENTS

| | | | | |
|---|---|---|---|---|
| 5,586,012 A | * | 12/1996 | Lerman | 361/826 |
| 5,765,698 A | * | 6/1998 | Bullivant | 211/26 |
| 5,788,087 A | * | 8/1998 | Orlando | 211/26 |
| 5,902,961 A | * | 5/1999 | Viklund et al. | 174/100 |
| 5,921,402 A | * | 7/1999 | Magenheimer | 211/26 |
| 6,102,214 A | * | 8/2000 | Mendoza | 211/26 |
| 6,215,069 B1 | * | 4/2001 | Martin et al. | 174/68.3 |
| 6,245,998 B1 | * | 6/2001 | Curry et al. | 174/72 A |
| 6,318,680 B1 | * | 11/2001 | Benedict et al. | 248/49 |
| 6,427,952 B2 | * | 8/2002 | Caveney et al. | 248/68.1 |

OTHER PUBLICATIONS

Chatsworth Products, Inc. Brochure for Megaframe Cabinet System, Technical Document Series for Network Housing Solutions (12 pages) Sep. 1997.

* cited by examiner

Primary Examiner—Dean A. Reichard
Assistant Examiner—Adolfo Nino
(74) Attorney, Agent, or Firm—Kennedy Covington Lobdell & Hickman, LLP

(57) ABSTRACT

A reversible wire management system includes a mounting bracket having first and second planar members, the first and second planar members each including a set of retention bracket mounting features, wherein each set of retention bracket mounting features includes at least one mounting feature, which may be a slot, for connecting the respective planar member to a retention bracket, and at least one retention bracket, which may be a bifurcated O-ring, removeably attached to the first mounting bracket planar member using the first set of retention bracket mounting features, wherein the at least one retention bracket is adaptable to be selectively removed and reconnected to the second mounting bracket planar member using the second set of retention bracket mounting features.

17 Claims, 3 Drawing Sheets

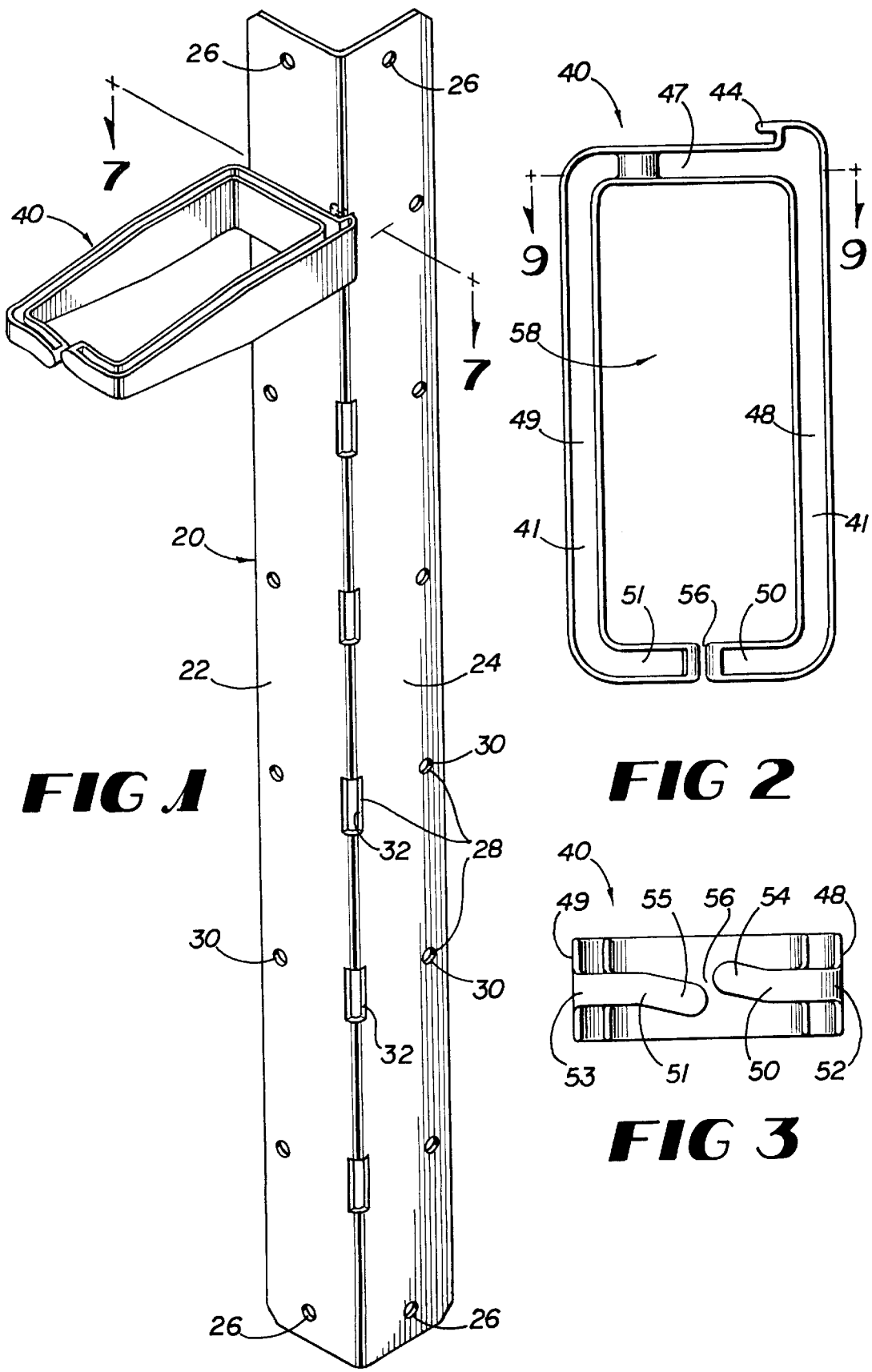

FLEXIBLE INTRA-CABINET CABLE RING WIRE MANAGEMENT SYSTEM

CROSS-REFERENCE TO RELATED APPLICATION

This application is entitled to the benefit of, and claims priority to, U.S. Patent Application Ser. No. 60/257,035, filed Dec. 20, 2000 and entitled "FLEXIBLE INTRA-CABINET CABLE RING WIRE MANAGEMENT SYSTEM."

BACKGROUND OF THE PRESENT INVENTION

1. Field of the Present Invention

The present invention relates generally to the field of wire management systems for electrical component racks, and more particularly to the field of multi-positional mounting brackets for electrical component racks utilizing redeployable retention brackets or rings for securely retaining wires or cables therein.

2. Background Art

As is well known, electrical component racks are heavily utilized to store computer equipment and other electrical equipment of a variety of types. The various components are mounted on or in such racks in close proximity to one another and connected together by cables, wires, or the like, collectively referred to herein as "wires."

Apparatuses for routing wires within and through the electrical component racks are likewise well known. In particular, a number of such apparatuses have utilized a plurality of rings or similar retention brackets attached to an elongated mounting bracket which may installed in a desired location in a given rack. Wires may then be held in place along the mounting bracket by routing them through the interiors of the respective rings or retention brackets. In order to facilitate simple insertion and removal of wires from the respective rings, a gap commonly exists in the body of each ring, thus connecting the interior of the respective ring or retention bracket to its exterior. Unfortunately, not only does the gap permit wires to be inserted into the ring or retention bracket interior, but it permits wires to escape as well. Thus, retention brackets making use only of fingerlike projections extending across the mounting bracket have large gaps which provide only minimal retention properties in the area of the gap.

One solution to this problem is to use D-shaped rings which have a very narrow gap at one corner of the "D". However, many prior art D-rings are rigid structures having fixed gaps which permit only a single wire having a cross-section smaller than the gap to be inserted into the interior at a time, thus limiting the size of wire which may be routed through the D-ring and requiring bundles of wires to be separated in order to install them within the interior of the D-ring. Other prior art D-rings are more flexible and may be bent outward by hand, thus widening the gap, to accommodate the insertion of wires. Unfortunately, the weight or other forces placed on the rings by the wires is usually directed in the same outward direction, and at the same point on the rings, as the force placed on the rings manually during wire insertion. The forces placed on the rings by the wires are frequently enough to bend the rings by themselves, thus widening the gap enough to allow the wires to escape. Thus, a need exists for a ring which is rigid enough to withstand the forces placed on it by the wires it surrounds but which is capable of providing a gap large enough to facilitate the insertion of bundles of wires.

Retention brackets or rings which may be moved from one location to another along a mounting bracket, or the structure of an electrical component rack itself, are also well known in the art. Prior art mounting brackets frequently include a plurality of retention bracket apertures, or sets of apertures, arranged along the length of a planar surface in the mounting bracket, and rings or retention brackets may be installed in any or all of the aperture sets as desired by the installer. This allows a certain amount of flexibility in choosing the locations of the associated retention brackets or rings. However, prior art apparatuses typically limit the placement of retention brackets to a single row of apertures along a single surface, which effectively allows retention brackets attached thereto to extend only in a single direction from the mounting bracket. Likewise, prior art mounting brackets typically have only a single side which may be mounted to an electrical component rack. Unfortunately, although prior art mounting brackets may be attachable in either a generally horizontal or vertical orientation, they may only be attached such with their retention bracket apertures facing a single direction relative to the structure of the electrical component rack. Thus, prior art mounting brackets provide an installer with no flexibility in positioning or orienting the mounting brackets in general, or the retention brackets in particular, relative to the electrical component rack.

Although it is well known for retention brackets or rings to be deployable in a plurality of locations along a mounting bracket, prior art retention brackets must commonly be held in place on the mounting bracket while a nut is threaded onto a screw or some similar operation is carried out to secure the retention bracket to the mounting bracket. Such a manual operation necessitates the use of two hands to complete the task: one hand to hold the retention bracket steady and a second hand to thread the nut or the like onto a screw. Unfortunately, an installer must frequently also support a handful of wires while at the same time fastening a retention bracket in a particular location, which becomes quite difficult when two hands are simultaneously needed to attach a retention bracket. In addition, in order to provide the structural strength necessary to hold the retention bracket securely in place on the mounting bracket, a plurality of screws are frequently utilized to provide support at more than one point on the retention bracket. In addition to requiring additional coordination by the installer, each additional screw which is installed requires an additional amount of installation time. Thus, a need exists for a retention bracket which may be installed quickly and easily with only a single hand.

SUMMARY OF THE PRESENT INVENTION

Briefly summarized, the present invention relates to a wire management system for an electrical component rack which utilizes one or more retention brackets mounted on a multi-positional mounting bracket in order to securely retain wires or cables therein. Broadly defined, the wire management system according to one aspect of the present invention includes: a mounting bracket having first and second planar members, each of which includes a set of retention bracket mounting features, wherein each set of retention bracket mounting features includes at least one mounting feature for connecting the respective planar member to a retention bracket; and at least one retention bracket removeably attached to the first mounting bracket planar member using the first set of retention bracket mounting features, wherein at least one retention bracket is adaptable to be selectively removed and reconnected to the second mounting bracket planar member using the second set of retention bracket mounting features. In features of this rack, the first set of retention bracket features is disposed adjacent to the second set of retention bracket features along the length of the mounting bracket; the first set of retention bracket features is symmetrically disposed relative to the second set of retention bracket features; the first and second planar members each further include a set of attachment features for attaching the mounting bracket to an electrical component rack; at least one retention bracket mounting feature is a member of both the first set of retention bracket mounting features and the second set of retention bracket mounting features; and the retention bracket mounting features include at least one slot.

In a second aspect of the present invention, a wire management system includes: a mounting bracket having at least one planar member, which includes a slot; and a wire retention bracket connected to the mounting bracket, the retention bracket having a tab inserted into the slot in the mounting bracket.

In features of the second aspect, the slot is disposed along one side of the planar member; the planar member is a first planar member and wherein the mounting bracket further includes a second planar member intersecting the first planar member along one side of the first planar member; and the planar member further includes a mounting aperture disposed adjacent the slot.

In a third aspect of the present invention, a bifurcated O-ring for a wire management system is provided which includes: a base portion; a first shaft extending from the base portion; a second shaft extending from the base portion; a first tip extending from the first shaft; and a second tip extending from the second shaft generally toward the first tip, wherein the base portion, first shaft, second shaft, first tip and second tip collectively defining an interior for routing wires therethrough.

In features of the third aspect, a gap is formed between the first and second tips; and at least a portion of at least one of the tips is angled.

In a fourth aspect of the present invention, a wire management system includes: a mounting bracket; and an O-ring, the O-ring including a base portion attached to the mounting bracket and a pair of side members extending from the base portion and having respective opposed distal ends disposed substantially adjacent each other, wherein the side members and base portion collectively define an interior.

The present invention also includes a method of installing a wire in a wire management system having at least one retention bracket which includes first and second members extending from a base portion, the first member having a tip extending from a distal end thereof, the tip being separated from the second member at a separation point, and the base portion, first member and second member collectively defining an interior, wherein the method includes the steps of: temporarily applying pressure to the tip, in a direction orthogonal to both the tip and the first member, sufficient to increase the separation between the tip and the second member; inserting a wire through the increased separation and into the interior; and removing the pressure from the tip, thereby allowing the retention bracket to return to its original position.

In features of this method, the first member extends from the base portion in a first direction, and the step of temporarily applying pressure including the step of rotating the tip about an axis defined by the direction of extension of the first member; the tip is a first tip, the second member of the retention bracket further has a second tip extending from a distal end thereof toward the first tip, and the method further includes the steps of temporarily applying pressure to the second tip, in a direction orthogonal to both the second tip and the second member, sufficient to increase the separation between the second tip and the first tip, and removing the pressure from the second tip, thereby allowing the retention bracket to return to its original position.

In still another aspect of the present invention, a wire management system includes: a mounting bracket which includes first and second planar members, wherein a slot is disposed at the intersection of the planar members; and a plurality of bifurcated O-rings removeably mounted on the first mounting bracket planar member, each O-ring including a base portion having a tab inserted into the mounting bracket slot, and each O-ring further including a pair of side members extending from the base portion and having respective opposed distal ends disposed substantially adjacent each other, wherein the side members and base portion collectively define an interior.

BRIEF DESCRIPTION OF THE DRAWINGS

Further features, embodiments, and advantages of the present invention will become apparent from the following detailed description with reference to the drawings, wherein:

FIG. 1 is a perspective view of a flexible intra-cabinet cable ring wire management system, including a mounting bracket and a retention bracket, in accordance with the present invention;

FIG. 2 is a top plan view of the retention bracket of FIG. 1, the bottom of which is a mirror image and therefore not shown;

FIG. 3 is a front elevational view of the retention bracket of FIG. 1;

DETAILED DESCRIPTION OF THE PREFERRED EMBODIMENTS

Figure 5:
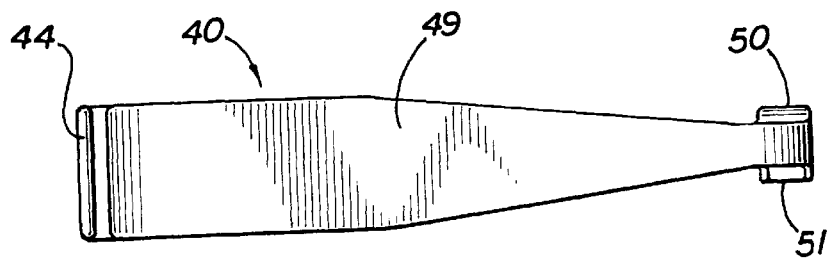
FIG. 5 is a right side elevational view of the retention bracket of FIG. 1.

FIG. 1 shows a flexible intra-cabinet cable ring wire management system in accordance with the preferred embodiments of the present invention. The system includes a mounting bracket 20 and one or more retention brackets 40. The mounting bracket 20 includes a first angle 22, a second angle 24, a plurality of mounting apertures 26 and a plurality of sets of ring mounting features 28. The first and second angles 22, 24 are integrally formed from a single piece of sheet metal of a desired length and are disposed at right angles to each other. The mounting apertures 26 are of suitable dimension and location for attaching the mounting bracket 20 to the interior framework of an electrical component rack, an example of which is disclosed in the commonly-assigned U.S. patent application Ser. No. 09/599, 114, the entirety is hereby incorporated herein by reference. The mounting bracket 20 may be attached to the electrical component rack by inserting fasteners of suitable dimensions through the mounting apertures 26 and into corresponding mounting features on the electrical component rack. As shown, mounting apertures 26 are disposed along both angles 22, 24 so that either angle 22, 24 may be mounted in the electrical component rack.

The ring mounting features 28 may take on a variety of forms, but preferably are arranged to be symmetrical with respect to the intersection between the first and second angles 22, 24. As shown, each set of ring mounting features 28 includes a pair of symmetrically disposed ring screw apertures 30 and a ring slot 32. The symmetry of each set of features 28 enables the same retention bracket 40 to be mounted on either angle 22, 24 of the mounting bracket 20 in the same manner, an exemplary embodiment of which is described herein. A plurality of these sets of features 28 are disposed generally uniformly along the length of the mounting bracket 20 to provide a variety of mounting locations for one or more retention bracket 40.

FIG. 2 is a top elevational view of the retention bracket of FIG. 1. Each retention bracket 40 includes a bifurcated O-ring 41 and an attachment means for securing the O-ring 41 to the mounting bracket 20. The O-ring 41 is formed from a resilient plastic which may be deformed by applying force but which returns to its original shape as soon as the force is eliminated. As shown, the O-ring 41 is generally rectangular in shape and includes a proximate base portion 47, two parallel shafts 48, 49 extending perpendicularly from the base portion 47, and a pair of distal tips 50, 51, each of which extends perpendicularly from a respective shaft 48, 49. It should be clear, however, that other O-rings having differing geometries or composition well known to one of ordinary skill in the art may be also be mounted to the mounting bracket 20 using the ring wire management system of the present invention. For example, the O-rings 41 may instead be substantially circular in shape, or may utilize a pair of generally C-shaped members extending from the base portion 47, or the like.

FIG. 3 is a front elevational view of the retention bracket of FIG. 1. As shown therein, the respective tips 50, 51 each include a first portion 52, 53 and a second portion 54, 55. The first portions 52, 53 extend toward each other from their respective shafts 48, 49 along a generally coaxial course, but the second portions 54, 55 are slightly angled relative to their respective first portions 52, 53. A narrow gap 56 is created at the separation point between the distal ends of the respective second portions 54, 55. Significantly, the O-ring 41 may be designed such that the gap 56 is as narrow as is commercially practical. In some applications the gap 56 may be designed to be narrower than the most slender wire to be installed within the O-ring 41. However, it should be obvious that a wider gap 56 may instead be used, or that the distal ends of the respective second portions 54, 55 may actually contact each other, thereby reducing the effective size of the gap 56 to zero, depending upon the application. Collectively, the base portion 47, the shafts 48, 49 and the tips 50, 51 define an O-ring interior 58 through which one or more wires may be routed.

Further, although not specifically shown, it should be obvious to one of ordinary skill in the art that second portion angles such as the ones illustrated would allow the second portions 54, 55 of the tips 50, 51 to be extended alongside each other. In such an arrangement, the gap between the distal ends of the second portions 54, 55 would disappear when viewed from directly above or below the retention bracket as shown in FIG. 2. It should also be obvious that the angles could be chosen so that the sides of the second portions 54, 55 abut each other, thus eliminating the gap substantially completely.

Figure 7:
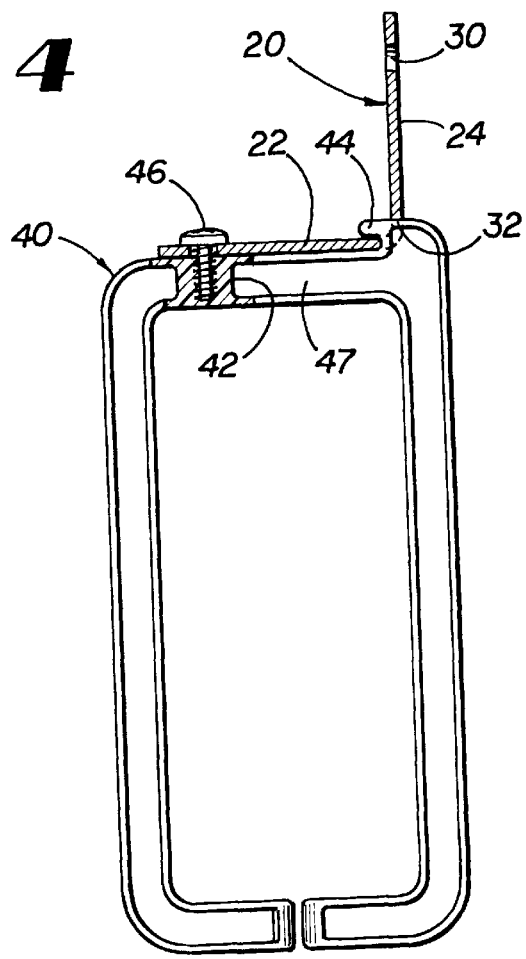
FIG. 7 is a fragmentary cross-sectional view taken along lines 7—7 in FIG. 1.

The attachment means is disposed at or near a point on the O-ring 41 generally opposite the separation point, and may include more than one feature. As best shown in FIG. 7, the attachment means is disposed along the base portion of the O-ring 41 and includes an integrated hook tab 44 and a set screw 46. The hook tab 44 may be inserted into any corresponding slot 32 in the mounting bracket 20. Although as shown, the slots 32 are disposed at the intersection of the first angle 22 with the second angle 24, it should be clear that the slots 32 could alternatively be disposed entirely in one or the other of the angles 22, 24, or the slots 32 may be configured as rectilinear notches along the distal edges of the angles 22, 24. The O-ring 41 and hook tab 44 are preferably of such dimensions that a sufficient moment of force is created by the O-ring 41 and the hook tab 44 on the surfaces of the mounting bracket 20 to hold the retention bracket 40 in place in the chosen slot 32. The retention bracket 40 may then be further secured to the mounting bracket 20 by fastening the set screw 46 through the ring screw aperture 30 which corresponds to the selected slot 32 and into a correspondingly-threaded ring screw receptacle 42. Alternatively, the ring screw receptacle may be unthreaded if the set screw 46 is of the self-tapping type.

Figure 8:
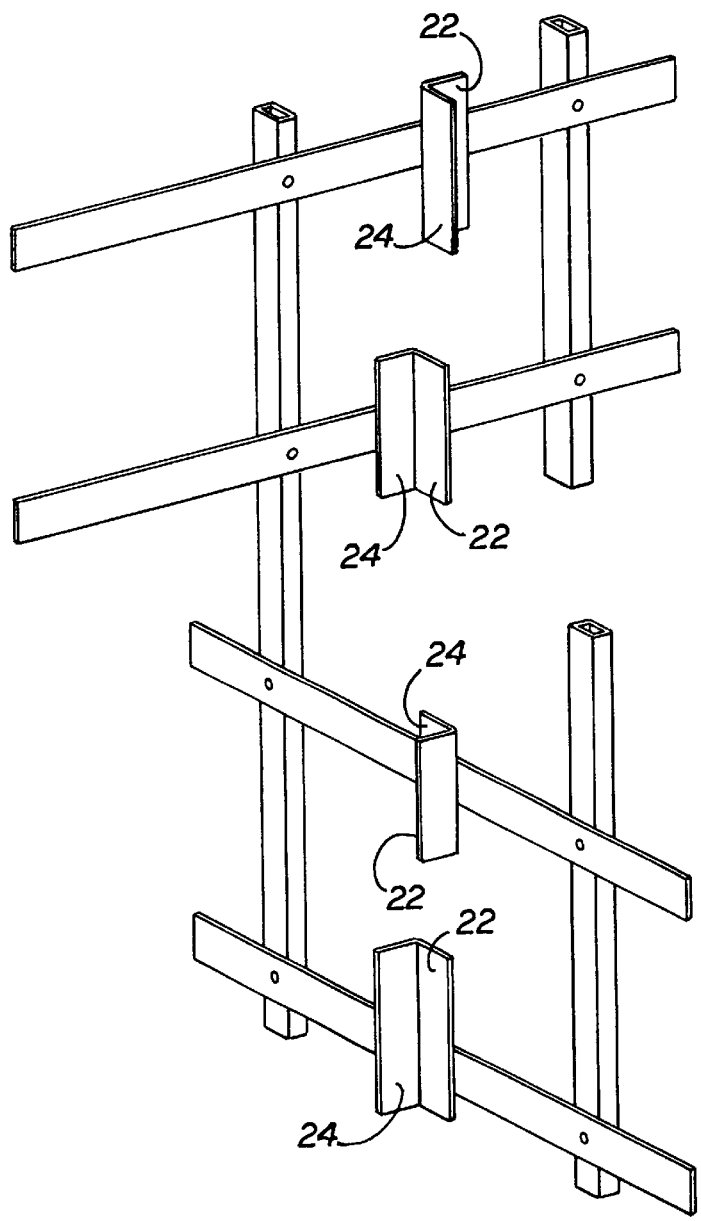
FIG. 8 is a schematic view illustrating some of the variety of installation orientations available for the mounting bracket of FIG. 1.

In use, the mounting bracket 20 is first mounted in the electrical component rack. As described previously, either angle 22, 24 of the mounting bracket 20 may be attached to the structure of the electrical component rack by inserting suitable fasteners through the mounting apertures 26 along the respective angle 22, 24. Thus, an installer may choose to install the mounting bracket 20 in any of several orientations relative to the structure of the electrical component rack. For example, the mounting bracket 20 may be installed against either a frontward-, sideward- or backward-facing surface, and may be oriented to face forward, rearward or to the left or the right, as illustrated in FIG. 8. Although not illustrated, it should also be obvious that the mounting bracket 20 may further be installed horizontally as well.

Once the mounting bracket 20 is installed, retention brackets 40 may be installed on the mounting bracket 20 as desired. Alternatively, the retention brackets 40 may have been pre-installed on the mounting bracket 20, in which case, the retention brackets 40 may be repositioned as desired. Significantly, if necessary, the installer may easily install each retention bracket 40 with one hand by inserting the hook tab 44 in the ring slot 32 in the desired orientation until the hook tab 44 is firmly seated in the slot 32. Once the retention bracket is 40 seated, the installer may release the retention bracket 40 and insert a fastener through the corresponding ring screw aperture and into the ring screw receptacle. At a convenient time, the fastener may then be tightened within the receptacle 42 with a screwdriver or the like to ensure that the retention bracket 40 is secured in place. This procedure may be repeated to install additional retention brackets 40 on the mounting bracket 20 as desired, or may be reversed to remove previously-installed retention brackets 40 from the mounting bracket 20.

Once one or more retention bracket 40 is attached to the mounting bracket 20, an installer may choose to route wires, cables and the like (generically referred to herein as "wires") through the respective O-rings 41. If at least one end of a wire remains unconnected, that wire end may simply be inserted through the interior 58 formed by the O-ring 41.

However, wires which are already connected at both ends may be installed within an O-ring 41 as follows. First, pressure may be applied to either or both of the O-ring tips 50, 51. The direction of the force applied to a particular tip is dependent upon the direction of the angular deflection of the second portion 54, 55 of the respective tip 50, 51 with respect to the first portions 52, 53. For example, with regard to the exemplary O-ring illustrated herein, the second portion 54 of a first tip 50 is angled upward from the tip's first portion 52. Thus, upward pressure should be applied to this tip 50, causing the tip 50 to be rotationally deflected upward relative to the distal end of the first shaft 48. In addition, the torque thus placed on the distal end of the first shaft 48 causes the first shaft 48 and/or the base portion 47 to be twisted. On the other hand, the second portion 55 of a second tip 51 is angled downward from the tip's first portion 53. Thus, downward pressure should be applied to this tip 51, causing the tip 51 to be rotationally deflected downward relative to the distal end of the second shaft 49. In addition, the torque thus placed on the distal end of the second shaft 49 causes the second shaft 49 and/or the base portion 47 to be twisted as well. Thus, when upward pressure is applied to the first tip 50, when downward pressure is applied to the second tip 51, or both, the narrow gap 56 between the tips 50, 51 becomes considerably wider.

The size of the gap 56 thus created is dependent on a number of factors, including, but not necessarily limited to, the size of the initial gap 56, whether force is applied to both tips 50, 51, the amount of force applied to the respective tips 50, 51, the construction of the O-ring 41 and its various members and their resulting rigidity, and the like. In any event, the size of the gap 56 thus created should be large enough to enable the largest size of wire which is to be routed through the O-ring 41. It should further be clear to one of ordinary skill that a gap 56 having a suitable size might also be created merely by applying pressure to the distal ends of one or both of the respective shafts 48, 49.

Once the wire has been maneuvered through the gap 56 and resides in the O-ring interior 58, the pressure which had been placed on either or both of the tips 50, 51 or the shafts 48, 49 may be removed by releasing the respective O-ring members and allowing them to return to their respective positions. As a result, the gap between the tips 50, 51 of the O-ring 41 is once again narrowed. In one embodiment, the gap 56 is narrower than the most slender wire routed through the O-ring interior 58, in which case, no wire routed therethrough may be removed from the O-ring interior 58 without once again deforming one or more O-ring members from their respective positions. However, as described previously, the gap 56 may instead be wider or altogether non-existent, depending upon the application.

Figure 4:
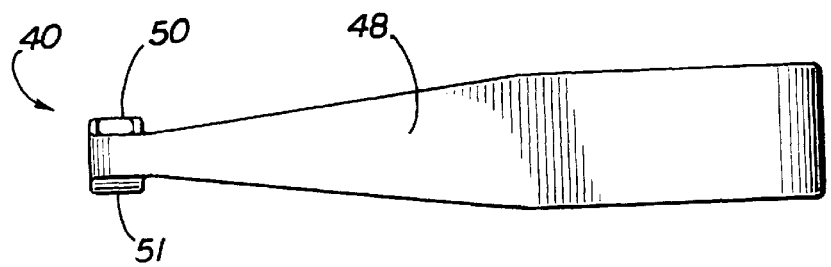
FIG. 4 is a left side elevational view of the retention bracket of FIG. 1.
Figure 6:
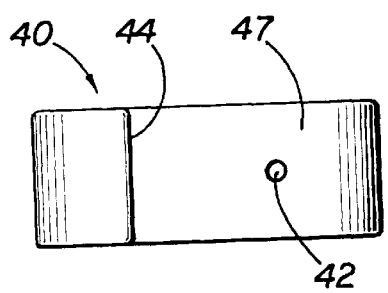
FIG. 6 is a rear elevational view of the retention bracket of FIG. 1.
Figure 9:
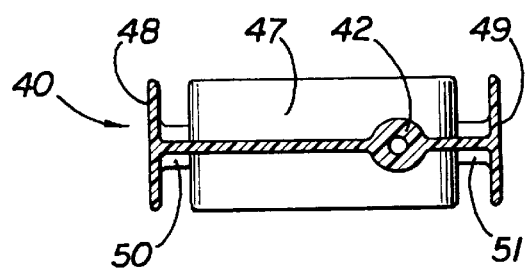
FIG. 9 is a cross-sectional view taken along lines 9—9 in FIG. 2.

As described previously, the O-ring 41 is formed from a resilient plastic which may be deformed by applying force but which returns to its original shape as soon as the force is eliminated. In particular, the O-ring may preferably be constructed such that the amount of force required to vertically displace either of the tips 50, 51 is relatively small compared to the amount of force required to horizontally displace the tips 50, 51, either relative to each other or relative to the base portion 47, or to horizontally displace the distal ends of the shafts 48, 49. One suitable construction is illustrated in FIG. 9, which is a cross-sectional view taken along lines 9—9 in FIG. 2. As shown, the cross-section of each member of the O-ring 41 is generally H-shaped. As shown in FIG. 2, the width of each member is substantially uniform, but as shown in FIGS. 4 and 5, the shafts 48, 49 are tapered from their respective junctions with the base portion 47 to their respective tips 50, 51. Because the forces exerted on the O-rings 41 by wires routed through the O-ring interior 58 tend to be largely directed in the horizontal direction rather than the vertical direction, the described construction is thus able to generally resist the larger forces placed on the members of the O-ring 41 by the wires while still enabling the O-ring tips 50, 51 to be easily manipulated by a user to insert or remove wires to or from the O-ring interior 58 using a relatively small amount of force.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A reversible wire management system comprising:
   a mounting bracket having first and second mutually perpendicular planar members, the first and second planar members each including a set of retention bracket mounting features, wherein each set of retention bracket mounting features includes at least one mounting feature for connecting the respective planar member to a retention bracket; and
   at least one retention bracket removeably attached to the first mounting bracket planar member using the first set of retention bracket mounting features, wherein the at least one retention bracket is adaptable to be selectively removed and reconnected to the second mounting bracket planar member using the second set of retention bracket mounting features.

2. The wire management system of claim 1, wherein the first set of retention bracket features is disposed adjacent to the second set of retention bracket features along the length of the mounting bracket.

3. The wire management system of claim 1, wherein the first set of retention bracket features is symmetrically disposed relative to the second set of retention bracket features.

4. The wire management system of claim 1, wherein the first and second planar members each further include a set of attachment features for attaching the mounting bracket to an electrical component rack.

5. The wire management system of claim 4, wherein the first set of attachment features is disposed adjacent to the second set of attachment features along the length of the mounting bracket.

6. The wire management system of claim 4, wherein the first set of attachment features is symmetrically disposed relative to the second set of attachment features.

7. The wire management system of claim 1, wherein at least one retention bracket mounting feature is a member of both the first set of retention bracket mounting features and the second set of retention bracket mounting features.

8. The wire management system of claim 1, wherein the retention bracket mounting features include at least one slot.

9. A wire management system comprising:
   a mounting bracket having at least one planar member, wherein the planar member includes a slot and further includes a mounting aperture disposed adjacent the slot; and
   a wire retention bracket connected to the mounting bracket, the retention bracket having a tab inserted into the slot in the mounting bracket.

10. The wire management system of claim 9, wherein the slot is disposed along one side of the planar member.

11. The wire management system of claim 10, wherein the planar member is a first planar member and wherein the mounting bracket further includes a second planar member intersecting the first planar member along one side of the first planar member.

12. The wire management system of claim 9, wherein the mounting aperture is laterally adjacent the slot along the length of the planar member.

13. The wire management system of claim 9, wherein the wire retention bracket further includes a mounting feature disposed to align with the mounting aperture.

14. A wire management system comprising:
   a mounting bracket, the mounting bracket including first and second planar members, wherein a slot is disposed at the intersection of the planar members; and
   a plurality of bifurcated O-rings removeably mounted on the first mounting bracket planar member, each O-ring including a base portion having a tab inserted into the mounting bracket slot, and each O-ring further including a pair of side members extending from the base portion and having respective opposed distal ends disposed substantially adjacent each other, wherein the side members and base portion collectively define an interior.

15. A bifurcated O-ring for a wire management system, the O-ring comprising:
   a base portion;
   first and second shafts extending from the base portion and, together with the base portion, defining a plane;
   first and second tips extending from respective shafts generally toward each other, wherein at least a portion of at least one of the tips is angled away from the plane;
   the base portion, shafts, and tips collectively defining a substantially enclosed interior for routing wires therethrough.

16. The O-ring of claim 15, wherein a gap is formed between the first and second tips.

17. The O-ring of claim 16, wherein the first and second shafts are resiliently deformable perpendicular to the plane to alter the gap, and substantially nondeformable within the plane.

* * * * *